April 8, 1947.   G. W. CORNELIUS   2,418,625
HYDRAULIC POWER TRANSMITTING MECHANISM
Filed July 7, 1945   3 Sheets-Sheet 1

Inventor·
George W. Cornelius
By Wallace and Cannon
Attorneys

April 8, 1947.  G. W. CORNELIUS  2,418,625
HYDRAULIC POWER TRANSMITTING MECHANISM
Filed July 7, 1945  3 Sheets-Sheet 2

Inventor-
George W. Cornelius
BY Wallace and Cannon
Attorneys

April 8, 1947.    G. W. CORNELIUS    2,418,625
HYDRAULIC POWER TRANSMITTING MECHANISM
Filed July 7, 1945    3 Sheets-Sheet 3

Inventor
George W. Cornelius
By Wallace and Cannon
Attorneys

Patented Apr. 8, 1947

2,418,625

UNITED STATES PATENT OFFICE 2,418,625

HYDRAULIC POWER TRANSMITTING MECHANISM

George W. Cornelius, Essex, Conn.

Application July 7, 1945, Serial No. 603,651

12 Claims. (Cl. 192—61)

This invention relates to hydraulic power transmitting mechanisms and particularly to such devices that may be in the form of either a clutch or a brake for connecting and disconnecting relatively rotatable parts.

It is well recognized that hydraulic power transmitting mechanisms of the aforesaid character may take either the form of a clutch or the form of a brake, and in either of such forms, the mechanism may be operated to connect or disconnect a pair of relatively rotatable parts or members. In either of the forms that may thus be assumed by hydraulic power transmitting mechanisms of the character to which this invention relates, the two members that are to be connected or disconnected are arranged to have a reversible liquid or hydraulic pump interposed therebetween so that the pumping elements of the mechanism are operated by and in proportion to the relative rotative movement of the two connected parts. When the parts or relatively rotatable members that are thus associated are to be freely rotatable one with respect to the other, the passages of the pump are in effect left open or unrestricted so that hydraulic liquid from a reservoir may be freely pumped through the pump and back into the reservoir. Such flow or pumping of hydraulic liquid through the pump may in such mechanisms be governed by valve means that are effective to cut off or variably restrict the high pressure or discharge side of the pump, and when the valve means are fully closed, a liquid lock is established in the pump so that the pump parts cannot move relative to each other, and hence the two connected members or shafts are held against relative rotation. Where the mechanism assumes the form of a clutch, such establishment of a liquid lock within the pump results in a one to one driving relationship between the two shafts, while in an instance where the mechanism takes the form of a brake, the rotatable member is locked to a stationary member, thereby to effect a braking or stopping action upon the rotatable shaft.

In hydraulic power transmitting mechanisms of the aforesaid character, the maintenance of the desired connection between the two relatively rotatable members is dependent upon the preservation of a completely filled relationship within the pump, and yet the clearances that are necessary between the relatively movable parts of such a pump always tend toward the production of leakage which will tend to cause relative movement of the connected members. It is therefore an important object of the present invention to minimize such leakage while allowing ample clearances for the parts of the pump when power is not being transmitted by the mechanism, and related objects are to afford pressure operated sealing means responsive to a power transmitting condition in the mechanism to effect a sealing action in respect to the relatively movable parts of the pump, and to enable such sealing means to be readily released when the power transmitting condition is discontinued.

In power transmitting mechanisms of the kind to which this invention relates, the direction of pumping operation of the pump thereof is of course dependent upon the relative direction in which the driving forces are applied thereto, and while such power transmitting mechanisms are usually intended to transmit power in but one direction, practical considerations render it necessary that similar control and similar power transmitting characteristics be incorporated in such mechanisms for both directions of operation or power transmission, and to enable this to be accomplished in a simple and advantageous manner is another important object of this invention. An object related to the foregoing is to similarly control the hydraulic circuit in such a mechanism on both sides of the pump, and to do this in such a manner that make-up liquid will be available in the event of pump leakage so as to insure maintenance of the desired liquid lock in the pump. More specifically it is an object to enable the pump in such a mechanism to be controlled by main valves that are operated in unison and which embody check valves that are effective to block discharge from the high pressure side of the pump while allowing entrance of low pressure make-up liquid into the lower pressure side of the pump.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 1 is a side elevational view, taken partially in longitudinal cross section along the line 1—1 of Fig. 2, and illustrating a clutch embodying the features of the invention;

Figure 1:
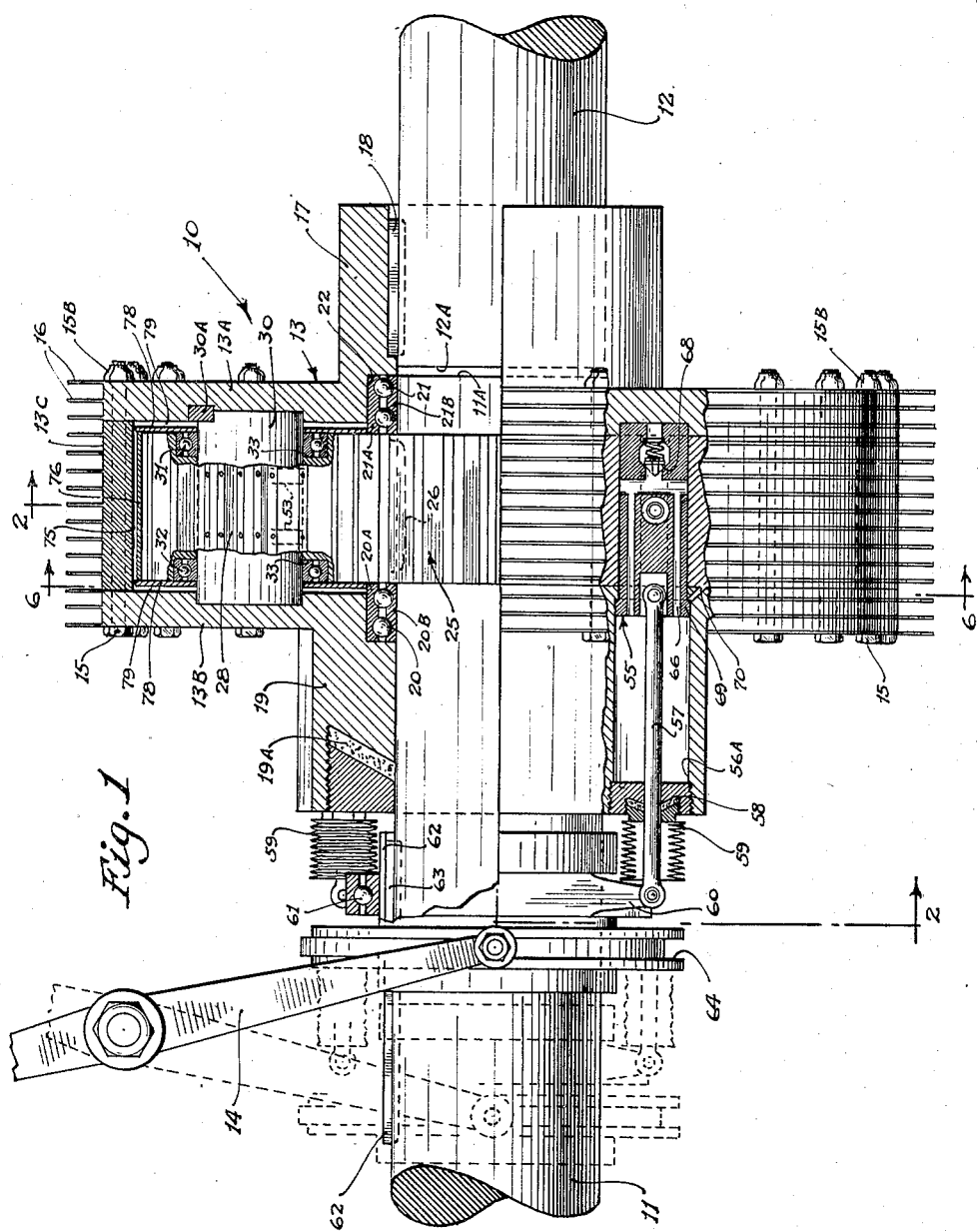

For purposes of disclosure the present invention is herein illustrated as embodied in a clutch 10 that serves as a connection between a driving shaft 11 and a driven shaft 12 that are in the present instance aligned one with the other. As will be evident in Fig. 1 of the drawings, the clutch 10 is mounted in part on each of the two shafts 11 and 12, and the clutch 10 includes a housing 13 within which pumping means and a reservoir are enclosed so as to afford a hydraulic pump that is driven by and in proportion to relative rotation of the two shafts 11 and 12, and valve means that are settable by an operating lever 14 are included in the housing 13 so that the pumping action of the pump may be controlled so as to thereby vary the power transmitting action between the shafts 11 and 12.

In the present embodiment of the invention, the pumping means are in the nature of a planetary gearing mechanism, one element of which is driven by the shaft 11 and the other of which is connected to the shaft 12 in a power transmitting relationship, and in such planetary gearing, the housing 13 serves as the planet carrier. Thus the housing 13 comprises a pair of disc-like side plates 13A and 13B that are arranged on opposite sides of a relatively thick and generally cylindrical central member 13C, and the three elements of the housing that are thus afforded are held together by tie bolts 15 and nuts 15B that are extended through the side plates 13A and 13B and through the intermediate central member 13C adjacent to the outer edges of these members. The outer peripheral surface of each of the members of the housing 13 is provided with a plurality of heat dissipating fins or ribs 16 that are annular in form and are disposed in spaced relation to each other as will be evident in Figs. 1 and 3. The side plate 13A of the housing has a mounting hub 17 that snugly surrounds the adjacent end of the shaft 12A and is keyed thereto as at 18, and it will be observed that the hub 17 is so located on the shaft 12 that the end 12A of the shaft is spaced from what may be termed inner face of the side plate 13A. The shaft 11 extends entirely through a hub 19 that is provided on the side plate 13B of the housing, and extends into the hub 17 of the side plate 13A so that the end 11A of the shaft 11 is disposed as shown in Fig. 1 of the drawings, and the housing 13 is rotatably related to the shaft 11 by a pair of anti-friction bearings 20 and 21 that are engaged with the shaft 11 at spaced points therealong. The hub 19 has a sealing gland 19A therein to prevent liquid leakage along the shaft 11 while permitting relative rotation of the hub and shaft. The bearing 20 has its outer race 20A set in a rabbetted groove formed in the side plate 13B so as to extend to the left in Fig. 1 from the inner face of the plate 13B, while the inner race 20B is secured in an embracing relationship about the shaft 11. Similarly, the outer race 21A of the bearing 21 is set in a rabbetted groove at 22 formed in the inner face of the side plate 13A, while the inner race 21B of the bearing 21 is engaged with the shaft 11 adjacent to the end 11A thereof.

Between the two bearings 20 and 21, the shaft 11 has a gear 25 fixed thereon by a key 26, and this gear 25 serves as the sun element of the planetary gear pump. The planet elements of the gear pump are in the present case provided by a pair of small gears or pinions 28 that are rotatably mounted in the housing on opposite sides of the gear 25 so as to be meshed with the gear 25. The precise construction and mounting of the two gears 28 is substantially similar, and therefore the details in this respect are illustrated only as to the upper one of the two gears or pinions 28. Thus as will be evident in Figs. 1 and 2 of the drawings, each pinion 28 is rotatably supported on a non-rotatable shaft 30 so that the ends of the shaft extend beyond the opposite sides of the pinion, and these extending ends of the shaft 30 are seated in the opposite side plates 13A and 13B and the shaft 30 is keyed against rotation by means such as a key 30A. The pinion 28 is rotatably supported on the shaft 30 by anti-friction ball bearings 31 and 32 respectively. The outer races of the bearings 31 and 32 are seated in recesses 33 formed in the opposite ends of the pinion 28, and the inner races of these bearings are arranged in embracing relationship to the shaft 30. Thus the pinions 28 may rotate with respect to the shaft 30.

Figure 2:
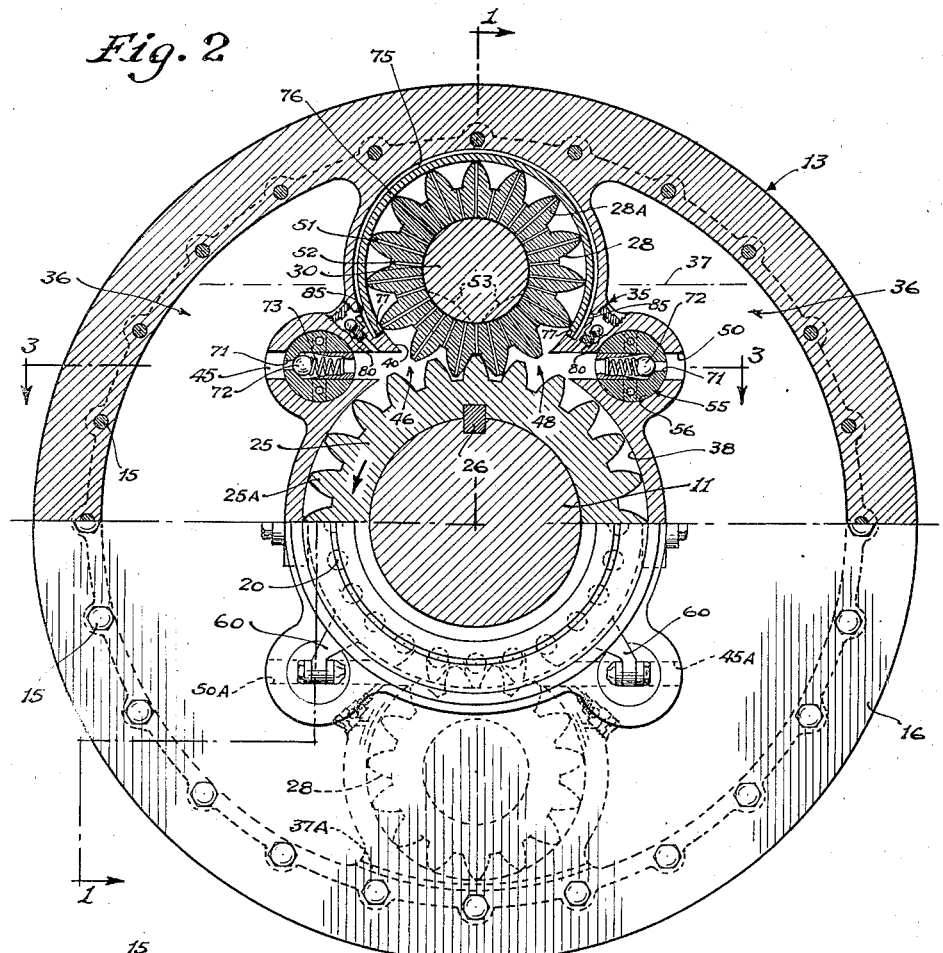
Fig. 2 is a sectional view taken substantially along the line 2—2 of Fig. 1.

The interior of the central section 13C of the housing is formed with a transverse body 35 that extends across the interior of the section 13C so as to define chambers 36 on opposite sides thereof that in effect constitute a reservoir within which hydraulic liquid may be contained for supplying the pump that is afforded by the gears 25 and 28, and this hydraulic fluid may be maintained in the chambers or reservoir 36 in an amount sufficient to reach to a level such as that indicated at 37 in Fig. 2 of the drawings, and the liquid in the two chambers may be equalized by a passage 37A extended through the body 35.

The transverse body 35 that is formed in the central section of the housing 13 is suitably recessed to provide a housing that cooperates with the gears 25 and 28 to afford a reversible gear pump, and within the walls of the web 35, the requisite liquid passages and valve means are provided as will be hereinafter described in detail. As will be evident in Fig. 2 of the drawings, the transverse body 35 is bored as at 38 to afford a chamber within which the gear 25 may rotate, and the diameter of the bore 38 is such that the teeth 25A of the gear 25 run with only a slight operative clearance with respect to the sides of the bore. In respect to the smaller gears or pinions 28, the transverse body is formed with bores 40 therein that are of such a size as to snugly engage the ends of the teeth 28A of the pinions 28, and thus the transverse body 35 affords a housing within which the gears 25 and 28 may operate as a reversible gear pump. When the gears 25 and 28 are rotating in the direction shown by the arrows in Fig. 2, hydraulic fluid will normally be drawn into the pump casing through a liquid passage 45 that connects the left hand chamber 36 with a chamber 46 that is formed at what then constitutes the intake side of the pump. It will be understood that a similar passage 45A is provided with respect to the lower one of the two gears 28 in Fig. 2, and the rotation of the gears causes the hydraulic liquid to be moved from the chamber 46 and around the axis of the pinions 28 in a clockwise direction and into what then constitutes a pressure or discharge chamber 48 as indicated in Fig. 2, and in a similar manner, hydraulic liquid is moved by the gear 25 in a counterclockwise direction from the passage 45A into the pressure chamber 48. From this discharge chamber 48, the hydraulic liquid normally tends to discharge through a discharge passage 50 into the right hand one of the chambers or reservoirs 36. A similar pumping action takes place with respect to the other gear 28, so that liquid also tends to discharge from the passage 50A. When the driving forces effective on the shafts are reversed, the pumping action is, of course, reversed so that the passages 50 and 50A constitute the intake passages of the pump while the passages 45 and 45A constitute the discharge passages.

In order that the pumping action of the pump may be rendered more efficient, a plurality of radial passages 51 and 52 are formed respectively inwardly from the ends of the teeth 28A, and inwardly from the bottoms of the spaces between the teeth 28A so that passages, during the time when the teeth 28A are meshing with the teeth 25A, will communicate with arcuate slots 53 formed in the non-rotatable shaft 30. Thus the hydraulic fluid trapped between the meshing teeth 25A and 28A may be forced inwardly through the passages 51 and 52 and may pass through the related slot 53 and back into the pressure side or chamber of the pump through other passages 51 and 52. This arrangement avoids the development of excessive pressures between the teeth of the meshed gears.

It has been pointed out hereinbefore that the pump that is afforded in the present transmitting mechanism may, in accordance with the relative direction or sense in which the driving forces are applied, tend to operate in either direction, and in the case of a clutch, this is determined by whether the driving force is applied by the driving engine or power plant, or is applied by the shaft that normally constitutes the driven shaft. For example, in an automobile or any similar vehicle, the driving action of the engine will tend to operate the pump in one direction, but where the clutch is left engaged while the engine is stopped and the vehicle is parked, the rolling tendency of the vehicle may tend to operate the pump in said one direction, or might tend to operate the pump in the other or reverse direction. Because of the situation that is thus presented, the present invention provides for similar control of all of the passages 45, 45A, 50 and 50A so that the desired extent or degree of power transmission between the shafts 11 and 12 will be attained irrespective of the direction in which driving power is applied to the two shafts; and this result under the present invention is attained in such a way that fluid will be supplied to the pump at all times so as to prevent starving of the pump with consequent failure to obtain the desired transmitting action.

Figure 3:
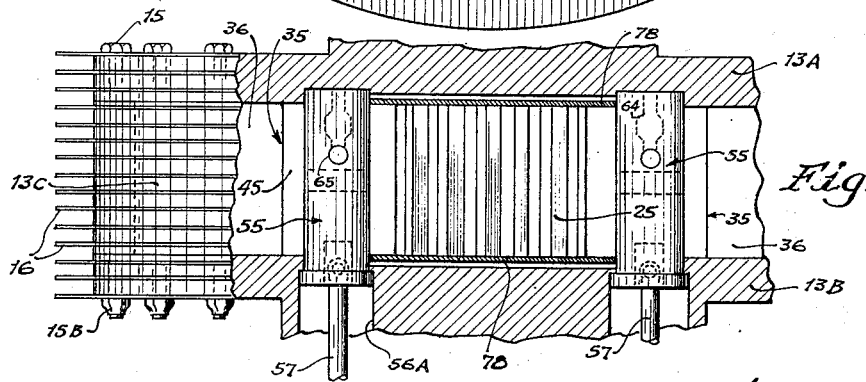
Fig. 3 is a sectional view taken substantially along the line 3—3 of Fig. 2.
Figure 4:
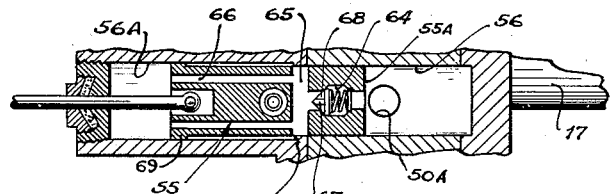
Fig. 4 is a fragmental sectional view showing one of the control valves in a different position.

The control means that are thus provided for each of the several passages 45, 45A, 50 and 50A are best shown in Figs. 1 to 4 and comprise a main valve 55 for each such passage mounted for movement from an open position shown in Fig. 4 to a closed position shown in Figs. 1 and 3. As will be evident in Figs. 1, 3 and 4, the passages 45, 45A, 50 and 50A are in the form of slots that extend entirely across the faces of the gears 25 and 28, and the bores 56 are disposed so the main valves 55 therein may completely block the related passages when the valves are in their fully closed positions of Fig. 1. Each main valve 55 is slidably mounted in a guide bore 56 that intersects with the passage, as 50A, that is to be controlled thereby, such guide bores 56 being disposed parallel to the axis of the shafts 11 and 12. Each main valve 55 has a connecting rod 57 connected thereto and extended parallel to the axis of the bore 56 through a packing gland 58 and an extensible dust shield 59, and the outer end of each rod 57 is connected to an operating arm 60. Four such operating arms 60 are thus required, and these arms are formed as radial extensions from the outer race of a ball bearing 61, the inner race of which is fixed on a sleeve 62 that is slidably keyed as at 63 to the shaft 11. The sleeve 62 is connected to an annularly grooved member 64 that is in turn operatively associated with the control lever 14 by means in the nature of a shifter fork so that by operation of the lever 14 the sleeve 62 and the bearing 61 may be shifted longitudinally of the shaft 11.

When the clutch is to be released so as to permit free rotation of the shaft 11 with respect to the shaft 12, the control lever 14 is shifted to the dotted line position shown in Fig. 1, and this shifts each of the main valves 55 to the open position shown in Fig. 4 of the drawings. The action with respect to all of the main valves 55 is the same, and as illustrated in Fig. 4, the end 55A of the valve 55 that is associated with the passage 50A is shifted to the left in Fig. 4 so as to progressively expose or open a greater area or portion of the slot-like passage 50A. Hence the hydraulic liquid may pass through the passage 50A and the intermediate guide bore 56 in either direction in accordance with the direction of operation of the gears of the pump.

When the clutch is to be engaged so as to assume a power transmitting relationship, the control lever 14 is shifted to the full line position of Fig. 1, thereby to position the valve 55 in the relationship shown in Figs. 1 to 3. In the course of such movement, the hydraulic fluid within the guide bore 56 and to the right of the end surface 55A as viewed in Fig. 4 is displaced, and liquid is drawn into the end 56A of the bore, and the flow of liquid is controlled in such a manner that unduly abrupt engagement of the clutch is prevented. Thus as will be evident in Figs. 1 and 4, each main valve 55 has a series of connected passages 64, 65 and 66 formed therethrough so as to enable passage of liquid from the bore 56 and into the left hand end 56A of the bore as the main valve is shifted. Such displacement of the hydraulic fluid is controlled by a relatively small passage 67 formed in a check valve 68 that is located in the passage 64. Thus the relatively small area of the passage 67 tends to retard the flow of liquid and thus controls the speed of engagement of the clutch. As to the disengagement of the clutch, however, the return flow of hydraulic liquid is relatively unrestricted, the check valve 68 being arranged to open as the main valve 55 is moved from the closed position of Fig. 1 to the open position of Fig. 4. In the closing movement of the valve there is a possibility that there may be hydraulic liquid trapped between a flange 69 of the valve 55 and a shoulder 69A that is formed where the bore 56 opens into the enlarged portion 56A, and for this reason a discharge passage 70 of relatively small area is provided from the enlarged portion 56A of the bore into one of the reservoirs 36.

When the main valves 55 have been moved to their effective or closed positions of Fig. 1, the flow of high pressure hydraulic liquid from the discharge chambers of the pump is blocked, and hence a liquid lock is established in the pump so that the shafts 11 and 12 are connected in a one to one power transmitting relationship. It will be recognized of course that in a pump of the kind that must be employed in devices of this character there must necessarily be operative clearances between the relatively moving parts, and by reason of these clearances there will tend to be some leakage that will allow corresponding relative movement of the parts of the pump. Because of this, the present invention provides for free entrance of make-up liquid so that starving of the pump is avoided and a proper liquid lock is maintained. Thus as will be evident in Figs. 1 to 4 of the drawings, each of the main valves 55 is provided with a transverse passage 71 therethrough and such transverse passages 71 are so located that when the main valves 55 are in their fully closed positions of Fig. 1, the transverse passages 71 are disposed in the inlet and outlet passages, as 45, that are controlled by the respective main valves. Each passage 71 is controlled by a check valve 72 that is normally urged toward a closed position by a spring 73, and these check valves 72 are so positioned as to permit relatively free entrance of hydraulic liquid into the pump while preventing discharge of hydraulic liquid from the pump. Thus it will be clear that regardless of the direction of operation of the pump, or regardless of the direction in which the driving forces are applied to the pump, two of the check valves 72 will be effective to block the discharge passages of the pump while the other two of the check valves 72 will permit entrance of make-up liquid as this may be required by leakage conditions in the pump.

Figure 6:
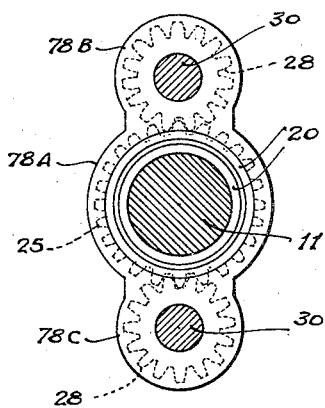
Fig. 6 is a fragmental sectional view showing the form of the side sealing plates.

Since the possibility of leakage of hydraulic liquid in the pumps of a power transmitting device represents a highly undesirable condition that results in slippage of the power transmitting device, the present invention provides means whereby such leakage may be reduced or prevented during times when heavy load is imposed upon the mechanism and yet, proper clearances are provided for these periods when the elements of the pump are to run freely in respect to each other. Thus, as will be evident in Figs. 1 and 2, the bore 40 in which each gear 28 is mounted is enlarged throughout substantially the entire circumference thereof wherein it opposes the ends of the teeth 28A, and this enlargement provides an arcuate pressure chamber 75. Within this pressure chamber 75 an arcuate pressure plate 76 is mounted in such a position that its ends may bear at its ends against abutment shoulders 77, and means are provided whereby pressure may be applied to the pressure chamber 75 so as to force the pressure plate or sealing plate 76 into snug engagement with the ends of the teeth 28A. The application and release of pressure in the chamber 75 is accomplished in a manner that will hereinafter be described in detail. It is of course desirable to prevent leakage of the hydraulic liquid out of the ends of the spaces between the teeth 28A, and for this purpose, sealing plates 78 are mounted in pressure chambers 79 on opposite sides of the gears 25 and 28 so as to enable these pressure or sealing plates 78 to be forced into a tight and sealing relationship with respect to the sides of the gears 25 and 28 when the clutch is in a power transmitting condition. The pressure plates 78 are of the general form shown in Fig. 6 of the drawings so as to provide a portion 78A that surrounds the outer races of the bearings 20 or 21 and also providing annular sections 78B and 78C, Fig. 6, that surround the shafts 30 so that they may bear against the end edges or sides of the gears 28 opposite the ends of the teeth 28A thereof. The sections 78B and 78C extend radially outwardly in such an amount that they also bear against the outer edges of the sealing plates 76, and it will be observed that the sections 78B and 78C are spaced from the wall of the pressure chamber 75 so that pressure applied in the chamber 75 is communicated into the pressure chambers 79. Hence all of the sealing or pressure plates 76 and 78 are applied and released concurrently.

Figure 5:
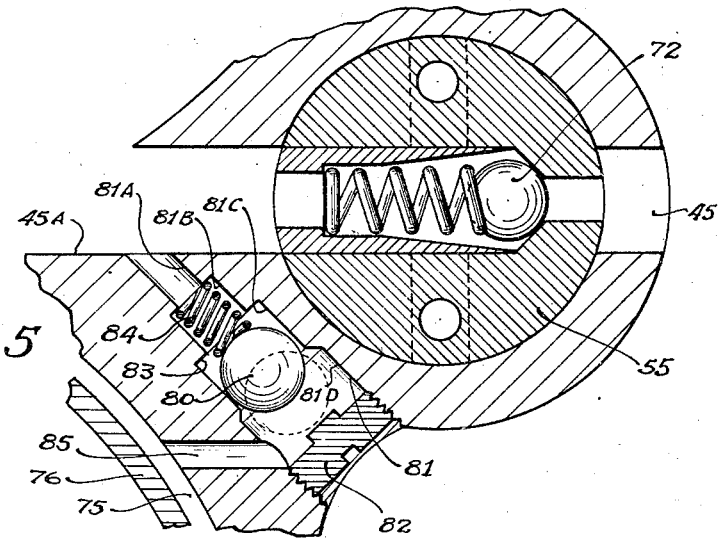
Fig. 5 is an enlarged sectional view showing a pressure control check valve.

The application and release of sealing pressure for the plates 76 and 78 is attained through valve means that operate in a similar manner in either direction of operation of the pump, and such valve means are similar in respect to each side of the pump. Thus as shown in Fig. 2 of the drawings, check valve means 80 are provided from the chambers 46 and 48 into opposite ends of the pressure chamber 75, but in Fig. 2 the showing of the valve 80 is somewhat diagrammatic in character, the actual construction being shown in Fig. 5 of the drawings. Thus each valve means 80 is provided by forming a stepped bore 81, Fig. 5, the body 35 adjacent to one of the valves 55, and this bore 81 communicates with the adjacent pressure chamber of the pump by intersecting with the related passage such as the passage 45A indicated in Fig. 5. The stepped bore 81 includes sections 81A, 81B, 81C and 81D of progressively increasing size and the outer end of the largest section 81D is closed by a plug 82. The valve member 80 is in the form of a ball disposed in the section 81C and adapted to seat on a valve shoulder or seat 83 so as to prevent flow of hydraulic liquid from the section 81D and into the bore as 45A. An expansive coil spring 84 disposed in the section 81B of the bore normally holds the valve member 80 in the open position shown in Fig. 5. The section 81D is connected to the adjacent end of the pressure chamber 75 by an angular bore 85 so that pressure fluid from one of the passages as 45A may pass the valve member 80 and flow through the passage 85 into the adjacent end of the pressure chamber 75. This will occur when the main valves 55 are closed, for under such conditions, pressure is built up in two of the chambers of the pumps. Under such circumstances, the pressure liquid will flow into the pressure chamber 75, and will act upon the other valve members 80 so as to move the same against the force of the spring 84 and into closing relationship to the valve seat 83. Thus so long as pressure is maintained in the first mentioned one of the chambers of the pump, the pressure from this chamber will be applied to the pressure chamber 75 and hence to the pressure chamber 79 so as to render the sealing plates 76 and 78 effective. When the main valves 55 are opened, the one of the valve members 80 that is in open position will of course tend to close, due to the release of the pressure on one side thereof which will result in a higher pressure being present in the pressure chamber 75. The valve construction shown in Fig. 5, however, allows this higher pressure in the chamber 75 to be dissipated before it can be effective to close the then open check valve 80, and this is due to the relationship of the size of the valve member 80 to the size of the sections 81C and 81D of the bore 81. In other words, a substantial volume of hydraulic liquid must flow from the valve chamber or section 81D and past the valve member 80 in order to move this valve member back from its fully open position, shown in dotted outline in Fig. 5, and into the reduced section 81C. This volume of hydraulic liquid that must flow to attain such movement of the valve member 80 is sufficient to release the pressure in the chamber 75, thereby to release the pressure plates 76 and 78 and permit free running of the parts of the pump when the clutch is released.

From the foregoing description it will be apparent that the present invention enables hydraulic power transmitting mechanism to operate in an extremely efficient manner not heretofore attained, and this advantageous operation results in a proper power transmitting relationship at all times. The arrangement is such that leakage of the pump is minimized or prevented, and yet free running of the parts of the pump is possible when the clutch or power transmitting mechanism is released. The power transmitting mechanism of the present invention attains the proper power transmitting relationship regardless of the direction in which the driving forces are applied, and starving of the pump with the attendant slippage or misoperation of the mechanism is prevented.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In a liquid power transmitting mechanism, a pair of relatively rotatable members, means affording a reversible liquid pump having relatively movable pumping elements operatively connected respectively to said members for pumping operation upon and in proportion to relative rotation of said members, said pump having means associated therewith affording a liquid supply reservoir and intake and discharge passages connected through said pump from said reservoir, shiftable main valves disposed in controlling relation to said passages and each having an open position wherein liquid may be pumped freely through the related passage and each main valve having a closed position in which the related passage is closed against discharge of liquid through said passage by said pump, control means for opening or closing both of said main valves in unison, and check valve means carried by each of said main valves and disposed in such positions that when said main valves are in their closed positions, one of said check valves is held closed by the discharge pressure of the pump while the other of said check valves is opened by any suction action of the pump.

2. In a hydraulic power transmitting mechanism, a planetary gear set having means enclosing said gears to provide a reversible gear pump and affording a liquid reservoir and having supply and discharge passages for the gear pump connected to said reservoir, shiftable main valves disposed in controlling relation to said passages and each having an open position wherein liquid may be pumped freely through the related passage and each main valve having a closed position in which the related passage is closed against discharge of liquid through said passage by said pump, control means for opening or closing both of said main valves in unison, and check valve means carried by each of said main valves and disposed in such positions that when said main valves are in their closed positions, one of said check valves is held closed by the discharge pressure of the pump while the other of said check valves is opened by any suction action of the pump to thereby enable make-up liquid to pass into the intake side of the pump and assure the maintenance of a liquid-lock therein.

3. In a power transmitting mechanism, differential gear means having input and output ends connected respectively to said relatively rotatable members, means enclosing said gear means to provide a reversible gear pump and affording a reservoir and having passages for the gear pump connected to said reservoir, shiftable main valves disposed in controlling relation to said passages and each having an open position wherein liquid may be pumped freely through the related passage and each main valve having a closed position in which the related passage is closed against discharge of liquid through said passage by said pump, control means for opening or closing both of said main valves in unison, and check valve means carried by each of said main valves and disposed in such positions that when said main valves are in their closed positions, one of said check valves is held closed by the outlet pressure of the pump while the other of said check valves is opened by any suction action of the pump to thereby enable make-up liquid to pass into the intake side of the pump.

4. In a hydraulic power transmitting mechanism, a pair of relatively rotatable members, means affording a reversible liquid pump having relatively movable pumping elements connected respectively to said members for pumping operation upon and in proportion to relative rotation of said members, said pump having means associated therewith affording a reservoir and passages connected through said pump from said reservoir, shiftable main valves disposed in controlling relation to said passages and each having an open position wherein liquid may be pumped freely through the related passage and each main valve having a closed position in which the related passage is closed against discharge of liquid through said passage by said pump, control means for opening or closing both of said main valves in unison, each of said main valves having a transverse opening formed therethrough and disposed in such positions that when said main valves are in their closed positions said transverse openings are disposed in alignment with the passages controlled by the respective main valves, check valves disposed in said transverse openings and so disposed that when said main valves are in their closed positions, one of said check valves is held closed by the outlet pressure of the pump while the other of said check valves is opened by any suction action of the pump to thereby enable make-up liquid to pass into the intake side of the pump and assure the maintenance of a liquid-lock therein.

5. In a power transmitting mechanism, a pair of relatively rotatable members, means affording a reversible pump having relatively movable pumping elements connected respectively to said members for pumping operation upon and in proportion to relative rotation of said members, said pump having means associated therewith affording a liquid reservoir and passages connected through said pump from said reservoir, shiftable main valves disposed in controlling relation to said passages and each having an open position wherein liquid may be pumped freely through the related passage and each main valve having a closed position in which the related passage is closed against discharge of liquid through said passage by said pump, control means for opening or closing both of said main valves in unison, check valve means carried by each of said main valves and disposed in such positions that when said main valves are in their closed positions, one of said check valves is held closed by the outlet pressure of the pump while the other of said check valves is opened by any suction action of the pump to thereby enable make-up liquid to pass into the intake side of the pump and assure the maintenance of a liquid-lock therein, and hydraulic means operable to limit the rate of closure of said main valves.

6. In a power transmitting mechanism, a pair of relatively rotatable members, means affording a reversible pump having relatively movable pumping elements connected respectively to said members for pumping operation upon and in proportion to relative rotation of said members, said pump having means associated therewith affording a liquid reservoir and passages connected through said pump from said reservoir, shiftable main valves disposed in controlling relation to said passages and each having an open position wherein liquid may be pumped freely through the related passage and each main valve having a closed position in which the related passage is closed against discharge of liquid through said passage by said pump, control means for opening or closing both of said main valves in unison, check valve means carried by each of said main valves and disposed in such positions that when said main valves are in their closed positions, one of said check valves is held closed by the outlet pressure of the pump while the other of said check valves is opened by any suction action of the pump to thereby enable make-up liquid to pass into the intake side of the pump and assure the maintenance of a liquid-lock therein, and hydraulic means including a check valve means and flow restricting passages operable to control the rate of opening and closing movements of said main valves.

7. In a fluid power transmitting mechanism, a pair of relatively rotatable members, means affording a reversible gear pump embodying a plurality of gears at least certain of which are connected respectively to said members for pumping operation upon and in proportion to relative rotation of said members, said pump having means associated therewith affording a liquid reservoir and passages connected through said pump from said reservoir, shiftable main valves disposed in controlling relation to said passages and each having an open position wherein liquid may be pumped freely through the related passage and each main valve having a closed position in which the related passage is closed against discharge of liquid through said passage by said pump, control means for opening or closing both of said main valves in unison, check valve means carried by each of said main valves and disposed in such positions that when said main valves are in their closed positions one of said check valves is held closed by the outlet pressure of the pump while the other of said check valves is opened by any suction action of the pump to thereby enable make-up liquid to pass into the intake side of the pump and assure the maintenance of a fluid-lock therein, shiftable sealing plates mounted for engagement with the peripheral edges and the end edges of at least certain of said gears, means affording pressure chambers for applying hydraulic sealing pressure to said plates, and valve means for controlling the application and release of said hydraulic pressure to apply hydraulic pressure when high pumping pressures are present in said pump and to release such hydraulic pressure when said pumping pressures are reduced.

8. In a fluid power transmitting mechanism, a pair of relatively rotatable members, means affording a reversible gear pump embodying a plurality of gears operatively associated with said members for pumping operation upon and in proportion to relative rotation of said members, said pump having means associated therewith affording a liquid reservoir and passages connected through said pump from said reservoir, shiftable main valves disposed in controlling relation to said passages and each having an open position wherein liquid may be pumped freely through the related passage and each main valve having a closed position in which the related passage is closed against discharge of liquid through said passage by said pump, control means for opening or closing both of said main valves in unison, check valve means carried by each of said main valves and disposed in such positions that when said main valves are in their closed positions one of said check valves is held closed by the outlet pressure of the pump while the other of said check valves is opened by any suction action of the pump to thereby enable make-up liquid to pass into the intake side of the pump and assure the maintenance of a fluid-lock therein, arcuate sealing plates mounted for engagement with the peripheral edges of at least certain of said gears and flat side sealing plates mounted for sealing engagement with the end edges of at least certain of said gears, means affording pressure chambers for applying hydraulic sealing pressure to said plates, and valve means for controlling the application and release of said hydraulic pressure to apply hydraulic pressure when high pumping pressures are present in said pump and to release such hydraulic pressure when said pumping pressures are reduced.

9. In a fluid power transmitting mechanism, a pair of relatively rotatable members, means affording a reversible gear pump embodying a plurality of gears operatively associated with said members for pumping operation upon and in proportion to relative rotation of said members, said pump having means associated therewith affording a liquid reservoir and passages connected through said pump from said reservoir, shiftable main valves disposed in controlling relation to said passages and each having an open position wherein liquid may be pumped freely through the related passage and each main valve having a closed position in which the related passage is closed against discharge of liquid through said passage by said pump, control means for opening or closing both of said main valves in unison, check valve means carried by each of said main valves and disposed in such positions that when said main valves are in their closed positions one of said check valves is held closed by the outlet pressure of the pump while the other of said check valves is opened by any suction action of the pump to thereby enable make-up liquid to pass into the intake side of the pump and assure the maintenance of a fluid-lock therein, shiftable sealing plates mounted for engagement with the peripheral edges and the end edges of at least certain of said gears, means affording pressure chambers for applying hydraulic sealing pressure to said plates, and delayed action check valves for controlling the application and release of said hydraulic pressure to apply hydraulic pressure when high pumping pressures are present in said pump and to release such hydraulic pressure when said pumping pressures are reduced.

10. In a fluid power transmitting mechanism, a pair of relatively rotatable members, means affording a gear pump embodying a plurality of gears operatively connected with said members for pumping operation upon and in proportion to relative rotation of said members, said pump having means associated therewith affording a liquid reservoir and passages connected through said pump from said reservoir, valve means disposed in controlling relation to said passages for controlling the pumping action of said pump, shiftable sealing plates mounted for engagement with the peripheral edges and the end edges of at least certain of said gears, means affording pressure chambers for applying hydraulic sealing pressure to said plates, and valve means for controlling the application and release of said hydraulic pressure to apply hydraulic pressure to said plates when high pumping pressures are present in said pump and to release such hydraulic pressure when said pumping pressures are reduced.

11. In a fluid power transmitting mechanism, a pair of relatively rotatable members, means affording a pump embodying a plurality of relatively rotatable pumping parts operatively connected with said members for pumping operation upon and in proportion to relative rotation of said members, said pump having means associated therewith affording a liquid reservoir and passages connected through said pump from said reservoir, valve means disposed in controlling relation to said passages for controlling the pumping action of said pump, at least one sealing plate mounted for engagement with one of said pumping parts, means affording a pressure chamber for applying hydraulic sealing pressure to said plate, and valve means for controlling the application and release of said hydraulic pressure to apply hydraulic pressure to said plate when high pumping pressures are present in said pump and to release such hydraulic pressure when said pumping pressures are reduced.

12. In a fluid power transmitting mechanism, a pair of relatively rotatable members, means affording a gear pump embodying a plurality of gears operatively connected with said members for pumping operation upon and in proportion to relative rotation of said members, said pump having means associated therewith affording a liquid reservoir and passages connected through said pump from said reservoir, valve means disposed in controlling relation to said passages for controlling the pumping action of said pump, shiftable sealing plates mounted for engagement with the end edges of at least certain of said gears, means affording pressure chambers for applying hydraulic sealing pressure to said plates, and valve means for controlling the application and release of said hydraulic pressure to apply hydraulic pressure to said plates when high pumping pressures are present in said pump and to release such hydraulic pressure when said pumping pressures are reduced.

GEORGE W. CORNELIUS.